UNITED STATES PATENT OFFICE.

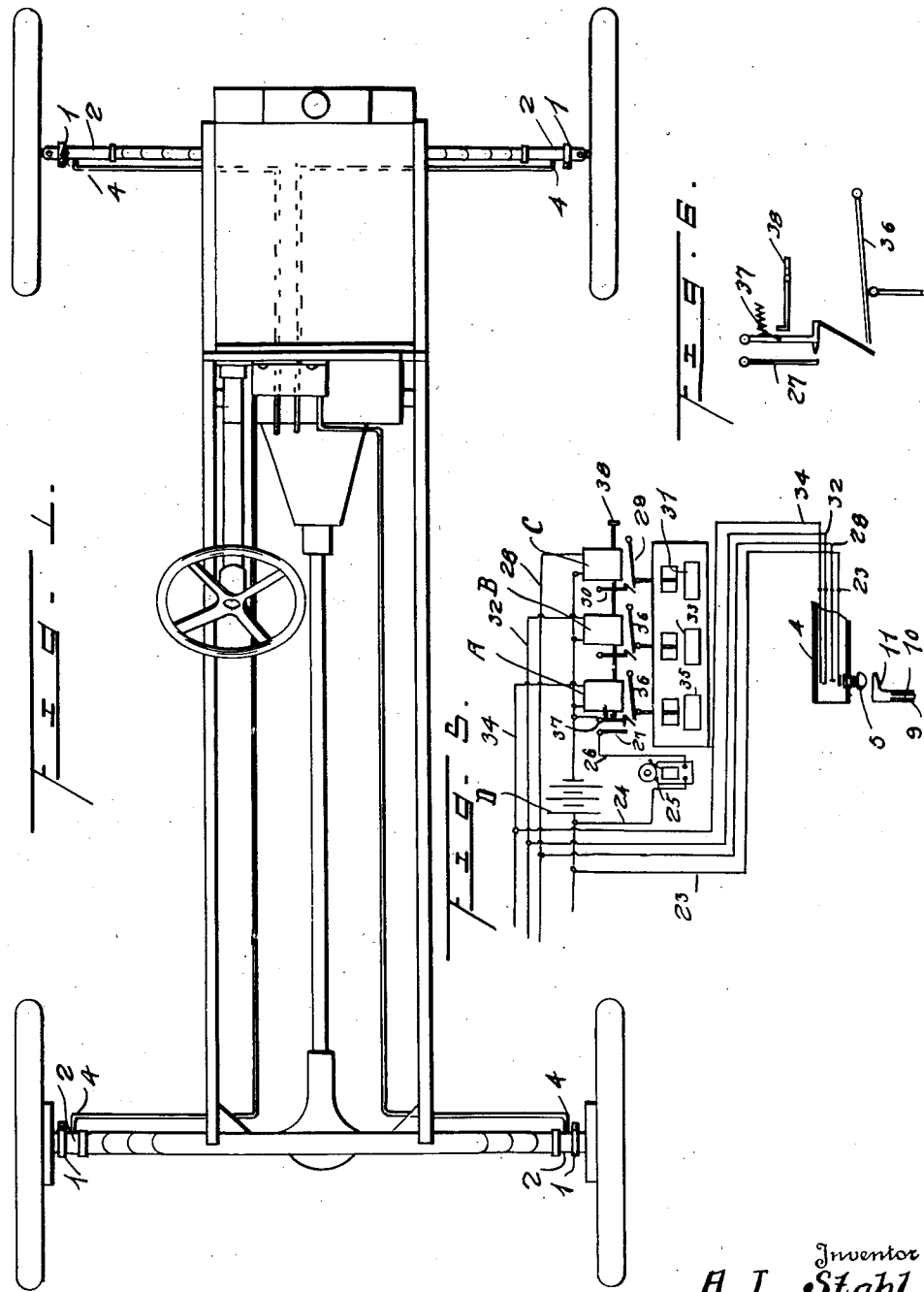

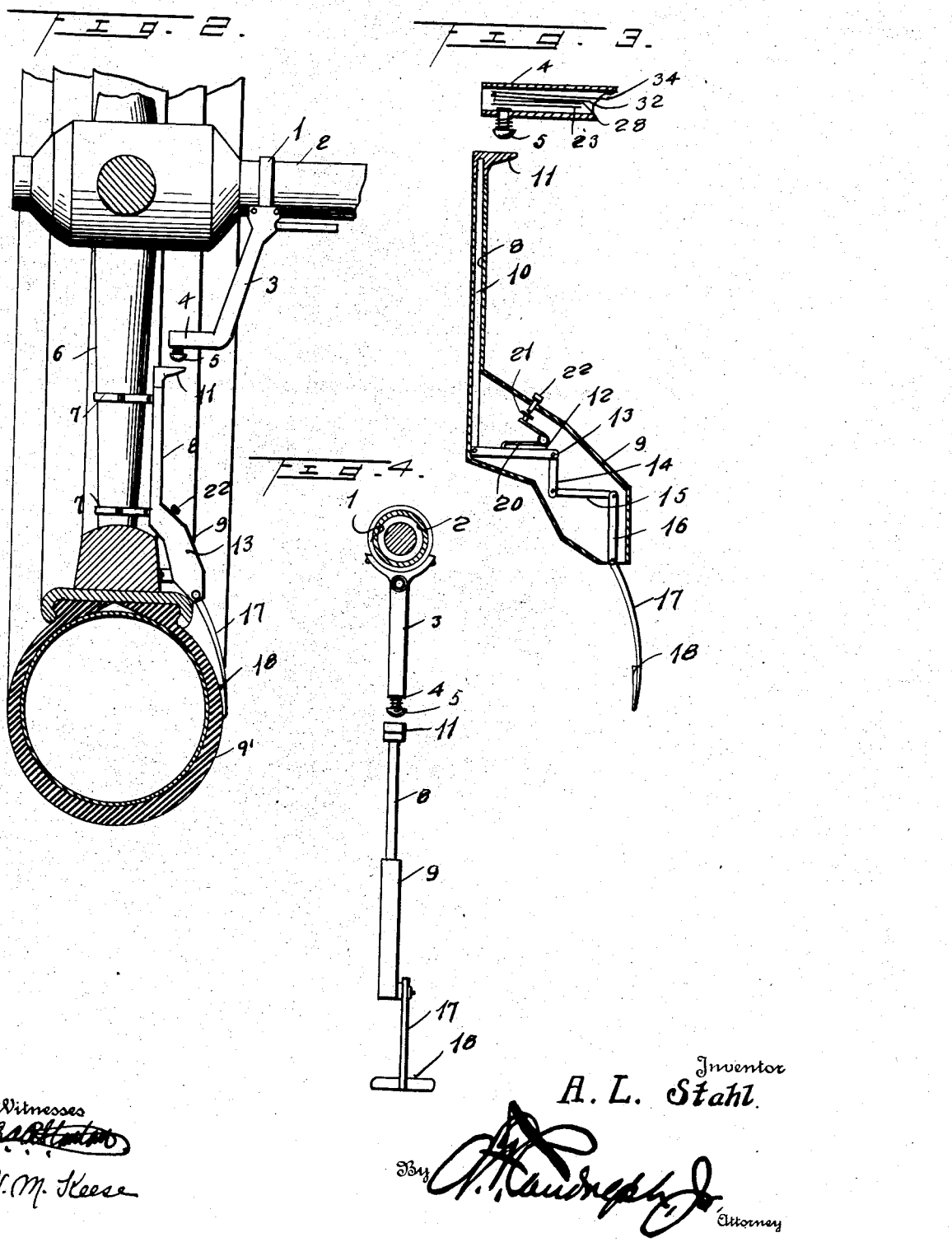

ALBERT L. STAHL, OF MEMPHIS, TENNESSEE.

TIRE-DEFLATING INDICATOR.

1,305,315.　　　　　Specification of Letters Patent.　　Patented June 3, 1919.

Application filed March 30, 1918. Serial No. 225,745.

*To all whom it may concern:*

Be it known that I, ALBERT L. STAHL, a citizen of the United States, residing at Memphis, in the county of Shelby and State of Tennessee, have invented certain new and useful Improvements in Tire-Deflating Indicators; and I do hereby declare the following to be a full, clear, and exact description of the invention, such as will enable others skilled in the art to which it appertains to make and use the same.

My invention relates to certain new and useful improvements in tire deflating indicators, of which the following is a specification.

The invention primarily relates to improvements in a tire deflating indicator that will first register a partial decrease of the air pressure in the tire, a second indicator operating when the pressure is still further decreased, and a third indicator coming into operation when the tire has become so flat that it is apt to be "rim cut"; the third indicator when coming into operation closing a circuit to ring an alarm bell, so that if for any reason the indicators have not been previously noticed the ringing of the alarm will draw the attention of the operator to the same. By providing a device of this kind the operator of an automobile may by glancing at the three indicators determine whether all of the tires are blown up to a predetermined pressure.

Another object of my invention is to so arrange the actuating parts and the electrical indicators that the operating member may be set at any predetermined position, that is it may be set to contact with the tire when it has 80 pounds of pressure and to operate the three registers when it has become deflated to a position where the same will rim cut.

Still other objects of my invention are to produce a device as above described that will consist of but few parts, simple in operation, and one that may be quickly and easily installed.

With these and other objects in view, my invention consists in certain new and novel constructions and combination of parts as will be hereinafter more fully described and pointed out in the claims.

Referring to the drawings forming a part hereof;

Figure 1 is a top plan view of a chassis of an automobile, showing the apparatus as wired to the four wheels thereof;

Fig. 2 is a view showing the hub of a wheel in elevation, one spoke and a section of a tire and the operating and contacting means as attached to the tire and spoke, and also the axle of the automobile;

Fig. 3 is an enlarged sectional view of the operating means;

Fig. 4 is a front view of the same showing the cover plate on the operating means;

Fig. 5 is a diagrammatic view of the electrical circuits, and also indicating the indicating means and alarm; and Fig. 6 is a diagrammatic view showing a portion of the alarm mechanism that is connected to the third circuit to ring the alarm when the tire becomes perfectly flat.

Referring now to the drawings, and more particularly to Figs. 2 and 3, it will be seen that secured by a band 1 or other preferable means to the axle of the automobile is a bracket 3, which extends inwardly as at 4, and in the bottom surface of the same is a spring shoe 5 that is adapted to close the different circuits in order, which will be hereafter referred to, and the wires of said circuit extending in said bracket and adapted to be moved by the operation of the shoe 5. Secured to the spoke 6 by bands 7 is a hollow bracket 8 which is enlarged as at 9. This hollow bracket is for the purpose of preventing dust or other foreign matter from entering the same to thereby interfere with the pivoted levers and arms to be hereinafter mentioned.

Fitting within the upright portion of this bracket 8 is a controlling rod 10, and to the upper end thereof is secured a head 11 which is adapted to come into contact with the spring contacting shoe 5 as will be shortly explained. A bell crank lever 12 is pivotally secured within the bracket 9 as at 13 and has connection with the vertically movable arm 10. A link 15 is pivotally connected to the opposite end of the bell crank lever as at 14. An arm 16 has pivotal connection with the link 15 and is adapted for moving the same in the direction of the arrow thereby moving the arm 10 upwardly. The lower end of the arm 16 is mounted on a transverse shaft 16' and has rigid connection with a controlling bar 17. A shoe 18 is carried by the bar 17 and is adapted for contact with a tire 18. A spring tension means 20 is fastened to the arm 12 and provided with a contacting means 21 on its opposite end, and the tension on the various arms 12, 14 and 17, etc., is to be regulated by the set screw 22. That is when the tire is fully extended and up to its normal pressure the shoe 18 should contact with the tire 19 and the head 11 should be just a slight distance from the spring contacting shoe 5. If the tire becomes somewhat deflated the arm 17 will move inwardly, which in turn will push the controlling rod 10 and the head 11 upwardly, forcing the said contacting shoe 5 a slight distance inwardly. As the tire becomes more deflated it will cause the contacting shoe 5 to be forced still farther inwardly and when the tire becomes so flat that it would rim cut the contacting shoe 5 is forced to its innermost position.

Before explaining the circuits coöperating with the contacting shoe 5, it is to be understood that an arrangement similar to the one I have just described is provided for all four wheels, and the wires leading from each contacting shoe are all connected to the one set of indicators and alarm.

Referring now to the different circuits as clearly shown in the diagrammatic view in Fig. 5, it will be seen that a wire 23 is common to one side of all three magnets A, B and C and also connected to both sides of the energizing source D. A separate wire 24 also connects to this wire 23 and is also connected at its other end to one end of the alarm 25. Leading from the opposite side of the alarm is the wire 26, which is connected to an alarm contact maker 27. A wire 28 is really the first contact maker, that is when the spring shoe 5 is first forced slightly upwardly it forces the end of the wire 28 in contact with the end of wire 28. By following these two wires it will be seen that the magnet C will be energized, thereby pulling the armature bar 29 upwardly and locking under the spring member 30. The armature bar 29 has pivotal connection with an arm 29'. The arm 29' as clearly shown in Fig. 5 is connected to a visual indicator 31 adapted for registration with an opening 31'. Upon the upward movement of the armature bar 29 the disk 31 will be brought into registration with the opening 31'.

The wire 32 is the next one to make contact with wire 23 when the contacting shoe 5 is forced farther upwardly and the current will pass through the wires 23 and 32 to operate magnet B and the indicating disk 33 positioned directly below the same. Wire 34 is the last one to make contact with wire 23 by the inward movement of the contacting shoe 5. The electric energy will pass through the common wire 23 and through the wire 34 and thereby operate the magnet A and the indicator 35 coöperating therewith.

However, on the operation of the magnet A it will be seen that the armature bar 36 will force a spring member 37 outwardly and thereby lock itself in an elevated position. It will also force this member 37 into contact with the aforementioned contact maker 27 that is connected to the one side of the alarm 25. We therefore have the three visual indicators showing and as the circuit is now complete throughout the three magnets and the alarm, the said alarm will ring continuously until stopped by the operator of the automobile.

An inclined arm 39 is connected to the lower end of the spring member 37 and is provided with a shoulder 39' adapted to lock the free end of the armature bar 36 in an elevated position. For the purpose of releasing the armature bars from the shoulders of the several inclined arms, I have provided a longitudinally movable restoring bar 38 adapted to engage the several spring members and thereby release the armature bars from the shoulders 39' to permit the same to assume their normal positions.

From the foregoing it will be seen that with my improved device different degrees of flatness of the tire will be indicated and when the tire has become so deflated that it would probably rim cut the last circuit is energized to operate the aforementioned alarm. The operating mechanism secured to a spoke of each wheel is so arranged that it is capable of delicate adjustment, which is desired in an apparatus of this kind.

Many slight changes may be made without departing from the spirit and scope of my invention.

Having thus described my invention, what I claim as new and desire to secure by Letters Patent is:

1. A tire deflation indicator comprising a bracket adapted to be secured to the spoke of a wheel, a controlling bar movably located in said bracket and provided with a head at its upper end, an arm adapted to contact with the side of a tire and move inwardly as said tire becomes inflated, said arm indirectly connecting with said controlling bar to force said controlling bar upwardly as the tire becomes deflated, a bracket adapted to be secured to the axle, an operating contacting shoe in the lower portion of said bracket and adapted to be forced inwardly by the upward movement of said head, a source of electrical energy, a circuit operated and closed by the upward movement of said contacting shoe, and an indicator energized and operated by said electrical energy when said circuit is closed to thereby show the partial deflation of the tire.

2. A tire deflation indicator comprising means contacting with the rim of a tire and adapted to move inwardly on the reduction of pressure in said tire, means connected with said aforementioned means to be forced upwardly by the inward movement of said first mentioned means, a plurality of electrical circuits, a source of electrical energy in said circuits, a contacting shoe adapted to be forced inwardly by the upward movement of said second mentioned means to thereby successively close the said circuits, indicators in said circuits and operated successively as the circuits are energized.

3. A tire deflation indicator comprising a bracket adapted to be secured to the spoke of a wheel, a controlling bar in said bracket and provided with a head at its upper end, a second controlling bar connected with said first mentioned controlling bar and adapted to move inwardly as the tire becomes deflated to thereby move said first mentioned controlling bar and brush head upwardly, a bracket adapted to be secured to the axle, a contacting shoe in the lower portion of said bracket and adapted to be forced inwardly on the upward movement of said brush head, a plurality of electrical circuits and a source of electrical energy located in said circuits, said circuits being closed in turn by the continued upward movement of said contacting shoe, a plurality of magnets and indicators and said magnets operating said indicators in turn by the successive upward movement of said contacting shoe and the closing of said circuits to thereby indicate different degrees of deflation of the tire.

4. A tire deflation indicator comprising a head and means connected therewith adapted to contact with the side of a tire and force said head upwardly as the deflation of the tire proceeds, a contacting shoe supported in a bracket, said contacting shoe adapted to be forced inwardly by said head, a plurality of electrical circuits, a plurality of magnets in said circuits, a plurality of indicators operated by said magnets when said magnets are energized, a source of electrical energy in said circuits, an alarm adapted to be energized when all three of said magnets have become energized, the said circuits energized successively on the continued upward movement of said contacting shoe.

5. A tire deflating alarm, consisting of means contacting with a tire and with a head to raise the same as said tire becomes deflated, tension means connecting indirectly with said head and with said contacting means to determine the normal position of said head and said contacting means, a plurality of electrical circuits, a source of electrical energy in said circuits, a magnet connected to each of said circuits and adapted to operate an indicator placed therebelow when said magnets are energized, an alarm adapted to operate when all of said magnets have been energized, a contacting shoe adapted to be operated by said brush head to successively close the said circuits on its continued upward movement to thereby energize the magnets in turn and thereby energize said alarm.

In testimony whereof I affix my signature in presence of two witnesses.

ALBERT L. STAHL.

Witnesses:
LOUIS L. BLAKLEY,
JOHN E. DREWRY.